United States Patent
Suzuki et al.

(10) Patent No.: US 10,674,392 B2
(45) Date of Patent: Jun. 2, 2020

(54) COMMUNICATION DEVICE, COMMUNICATION SYSTEM, COMMUNICATION METHOD, AND RECORDING MEDIUM HAVING COMMUNICATION PROGRAM RECORDED THEREON

(71) Applicant: NEC Corporation, Minato-ku, Tokyo (JP)

(72) Inventors: Motohiro Suzuki, Tokyo (JP); Yuki Ohno, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/084,317

(22) PCT Filed: May 12, 2017

(86) PCT No.: PCT/JP2017/017975
§ 371 (c)(1),
(2) Date: Sep. 12, 2018

(87) PCT Pub. No.: WO2017/199867
PCT Pub. Date: Nov. 23, 2017

(65) Prior Publication Data
US 2019/0075481 A1    Mar. 7, 2019

(30) Foreign Application Priority Data
May 16, 2016    (JP) .................................. 2016-097597

(51) Int. Cl.
*H04W 28/02* (2009.01)
*H04L 12/26* (2006.01)
(Continued)

(52) U.S. Cl.
CPC ....... *H04W 28/0236* (2013.01); *H04L 41/142* (2013.01); *H04L 43/0829* (2013.01);
(Continued)

(58) Field of Classification Search
CPC . H04W 28/0236; H04W 24/08; H04W 24/10; H04W 40/14; H04L 41/142;
(Continued)

(56) References Cited

U.S. PATENT DOCUMENTS

| | | | |
|---|---|---|---|
| 2014/0119214 A1* | 5/2014 | Jeon | ........................ H04L 43/50 370/252 |
| 2016/0156534 A1* | 6/2016 | Kawashima | .......... H04W 24/08 370/252 |

FOREIGN PATENT DOCUMENTS

| | | |
|---|---|---|
| EP | 2728799 A1 | 5/2014 |
| JP | 2010-213065 A | 9/2010 |

(Continued)

OTHER PUBLICATIONS

Extended European Search Report for EP Application No. EP17799291.4 dated Apr. 5, 2019.
International Search Report for PCT Application No. PCT/JP2017/017975, dated Aug. 15, 2017.
(Continued)

*Primary Examiner* — Walter J Divito

(57) ABSTRACT

A reception unit 11 receives transmitted packets. A first available band calculation unit 12 and a second available band calculation unit 13 calculate an available band for a transmission source of the packets. A calculation means determination unit 14 determines, on the basis of the reception states of the packets transmitted at predetermined time intervals in the reception unit 11, whether the first available band calculation unit 12 calculates the available band or the second available band calculation unit 13 calculates the available band. The first available band calculation unit 12 calculates the available band on the basis of a reception interval between the packets. The second available band calculation unit 13 calculates the available band on the basis of a time required for the reception of the transmitted series of packets and the sizes of the series of the packets.

6 Claims, 14 Drawing Sheets

(51) Int. Cl.
| | |
|---|---|
| *H04L 12/24* | (2006.01) |
| *H04L 29/08* | (2006.01) |
| *H04L 29/14* | (2006.01) |
| *H04W 24/08* | (2009.01) |
| *H04W 24/10* | (2009.01) |
| *H04W 40/14* | (2009.01) |
| *H04L 12/801* | (2013.01) |
| *H04N 21/442* | (2011.01) |

(52) U.S. Cl.
CPC .......... *H04L 43/0894* (2013.01); *H04L 67/22* (2013.01); *H04L 69/40* (2013.01); *H04W 24/08* (2013.01); *H04W 24/10* (2013.01); *H04W 40/14* (2013.01); *H04L 47/18* (2013.01); *H04N 21/44209* (2013.01)

(58) Field of Classification Search
CPC ..... H04L 43/0894; H04L 69/40; H04L 47/18; H04L 67/22; H04L 43/0829; H04N 21/44209

See application file for complete search history.

(56) References Cited

FOREIGN PATENT DOCUMENTS

| | | |
|---|---|---|
| JP | 2011-009919 A | 1/2011 |
| JP | 2015-220563 A | 12/2015 |

OTHER PUBLICATIONS

English translation of Written opinion for PCT Application No. PCT/JP2017/017975.
Taiwanese Office Action for TW Application No. 106113552 dated Oct. 17, 2019 with English Translation.

\* cited by examiner

Fig. 3

| 1 | 2 | 3 | 4 | 5 | 6 | 7 | 8 | 9 | ... | 110 | 111 | 112 | 113 | 114 | 115 |
|---|---|---|---|---|---|---|---|---|-----|-----|-----|-----|-----|-----|-----|
| 1 | 1 | 1 | 1 | 1 | 1 | 0 | 0 | 0 | ... | 0   | 1   | 1   | 1   | 1   | 1   |

Fig. 4

| 1 | 2 | 3 | 4 | 5 | 6 | 7 | 8 | 9 | ... | 110 | 111 | 112 | 113 | 114 | 115 |
|---|---|---|---|---|---|---|---|---|-----|-----|-----|-----|-----|-----|-----|
| 1 | 1 | 1 | 1 | 1 | 1 | 1 | 0 | 0 | ... | 0   | 1   | 1   | 1   | 1   | 1   |

COMMUNICATION DEVICE, COMMUNICATION SYSTEM, COMMUNICATION METHOD, AND RECORDING MEDIUM HAVING COMMUNICATION PROGRAM RECORDED THEREON

This application is a National Stage Entry of PCT/JP2017/017975 filed on May 12, 2017, which claims priority from Japanese Patent Application 2016-097597 filed on May 16, 2016, the contents of all of which are incorporated herein by reference, in their entirety.

TECHNICAL FIELD

The present invention relates to a communication device, a communication system, a communication method, and a communication program, which transmit and receive packets.

BACKGROUND ART

In order to measure an available band that is a band which is usable for communication between one communication device and the other communication device, there is a case in which each of a plurality of packets is transmitted and received at a predetermined time interval. Note that a series of packets which are transmitted at predetermined time intervals is also referred to as a packet train.

In such a case, one communication device transmits a packet train to the other communication device. Then, the other communication device calculates an available band, based on the transmission intervals and reception intervals of the series of packets transmitted by the one communication device.

PTL 1 discloses a system which calculates a packet loss rate, based on the number of transmitted packets and the number of received packets.

CITATION LIST

Patent Literature

[PTL 1]: Japanese Unexamined Patent Application Publication 2011-9919 A

SUMMARY OF INVENTION

Technical Problem

However, in a communication device which received a transmitted packet, when a packet arrived at shorter intervals than a time required for the processing of the transmitted packet, there is a case in which the arrived packets cannot properly be received and packets are lost. In such a case, there arises a problem that the available band between one communication device and the other communication device cannot properly be calculated.

The system disclosed in PTL 1 cannot solve such a problem, and there is a case in which the system cannot properly calculate the available band.

The object of the present invention is to provide a communication device, a communication system, a communication method, and a communication program, which can properly calculate an available band.

Solution to Problem

A communication device, according to the present invention, includes: reception means for receiving transmitted packets; first available band calculation means and second available band calculation means for calculating an available band for a transmission source of the packets; and calculation means determination means for determining, based on reception states of the packets transmitted at predetermined time intervals in the reception means, whether the first available band calculation means calculates the available band, or the second available band calculation means calculates the available band, wherein the first available band calculation means calculates the available band based on reception intervals between the packets, and the second available band calculation means calculates the available band based on a time required for the reception of a series of the transmitted packets and sizes of the series of the packets.

A communication system, according to the present invention, includes: the communication device described in any one of the aspects; and a packet transmission device connected to the communication device via a communication network and configured to transmit packets at predetermined time intervals.

A communication method, according to the present invention, includes: receiving transmitted packets in a reception step; calculating an available band for a transmission source of the packets in a first available band calculation step and a second available band calculation step; and determining, based on reception states of the packets transmitted at predetermined time intervals in the reception step, whether to calculate the available band in the first available band calculation step or to calculate the available band in the second available band calculation step, in a calculation means determination step, wherein the available band is calculated based on reception intervals between the packets in the first available band calculation step; and the available band is calculated based on a time required for the reception of a series of the transmitted packets and sizes of the series of the packets in the second available band calculation step.

A communication program, according to the present invention, causes a computer to execute: a reception process of receiving transmitted packets; a first available band calculation process and a second available band calculation process of calculating an available band for a transmission source of the packets; and a calculation means determination process of determining, based on reception states of the packets transmitted at predetermined time intervals in the reception step, whether to calculate the available band in the first available band calculation process or to calculate the available band in the second available band calculation process, wherein the available band is calculated based on reception intervals between the packets in the first available band calculation process; and the available band is calculated based on a time required for the reception of a series of the transmitted packets and sizes of the series of the packets in the second available band calculation process.

Advantageous Effects of Invention

According to the present invention, an available band can properly be calculated.

BRIEF DESCRIPTION OF DRAWINGS

FIG. 3 is an explanatory view illustrating an example of packet arrival presence/absence confirmation information.

FIG. 4 is an explanatory view illustrating an example of a packet loss model.

EXAMPLE EMBODIMENT

Example Embodiment 1

Figure 1:
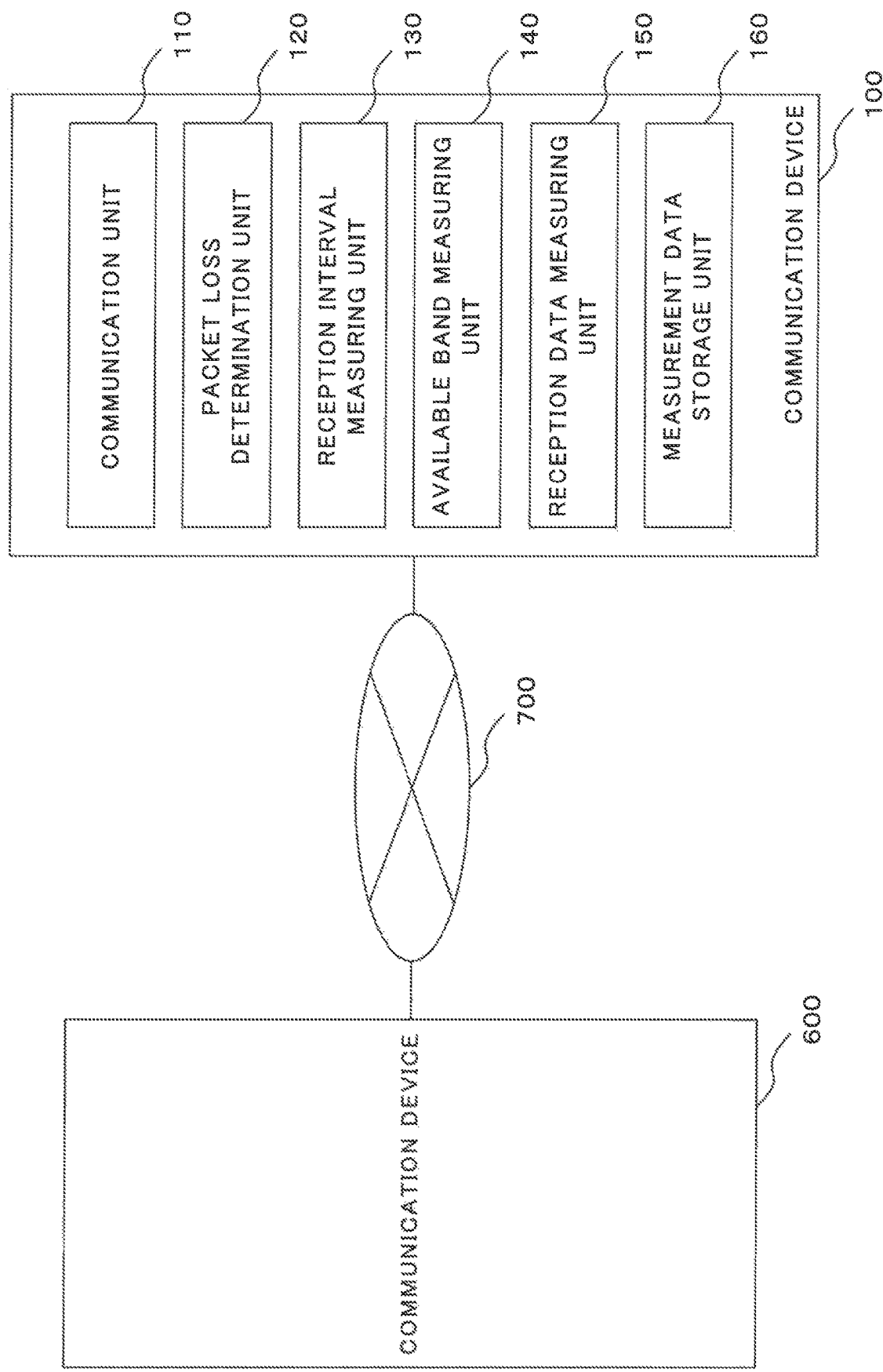
FIG. 1 is a block diagram illustrating a configuration example of a communication device of a first example embodiment of the present invention.

A communication device 100 of a first example embodiment of the present invention will be described with reference to the accompanying drawings. FIG. 1 is a block diagram illustrating a configuration example of the communication device 100 of the first example embodiment of the present invention. As illustrated in FIG. 1, the communication device 100 of the first example embodiment of the present invention is connected to a communication network 700 to which a communication device 600 is connected.

In addition, the communication device 100 of the first example embodiment of the present invention includes a communication unit 110, a packet loss determination unit 120, a reception interval measuring unit 130, an available band measuring unit 140, a reception data measuring unit 150, and a measurement data storage unit 160.

The communication unit 110 receives packets transmitted by the communication device 600.

The packet loss determination unit 120 inputs the packets received by the communication unit 110 to the reception interval measuring unit 130 or reception data measuring unit 150, in accordance with the reception states of the packets in the communication unit 110.

The reception interval measuring unit 130 measures packet reception intervals which are intervals of reception of packets by the communication unit 110, based on the input of the packets by the packet loss determination unit 120.

The available band measuring unit 140 calculates an available band, based on the packet reception intervals measured by the reception interval measuring unit 130.

The reception data measuring unit 150 calculates a reception speed of packets in the communication unit 110, based on the packets input by the packet loss determination unit 120. Note that the calculated reception speed is, in other words, an available band. Accordingly, in the present example, the reception data measuring unit 150 calculates the available band in a communication path between the communication device 600 and the communication device 100.

In the measurement data storage unit 160, stored is information indicative of the available band calculated by the reception interval measuring unit 130 or available band measuring unit 140. Besides, the measurement data storage unit 160 may store information indicative of the packet reception intervals measured by the reception interval measuring unit 130.

Figure 2:
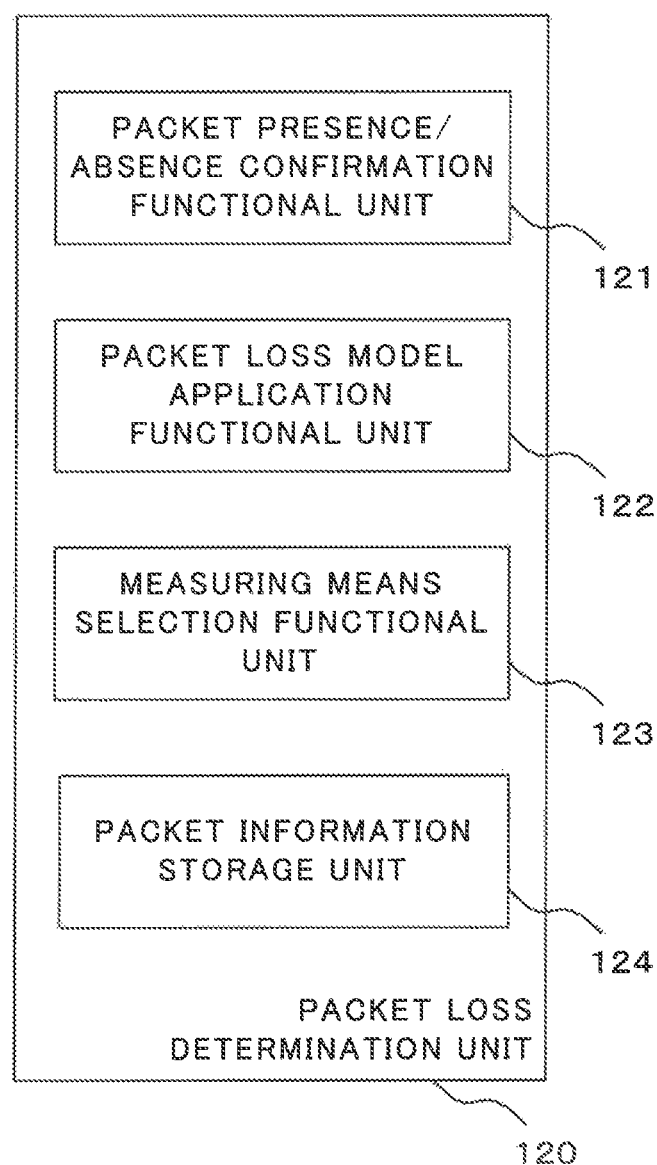
FIG. 2 is a block diagram illustrating a configuration example of a packet loss determination unit.

FIG. 2 is a block diagram illustrating a configuration example of the packet loss determination unit 120. As illustrated in FIG. 2, the packet loss determination unit 120 includes a packet presence/absence confirmation functional unit 121, a packet loss model application functional unit 122, a measuring means selection functional unit 123, and a packet information storage unit 124.

The packet presence/absence confirmation functional unit 121 generates packet arrival presence/absence confirmation information which indicates whether the communication unit 110 received packets or not.

Figure 3:
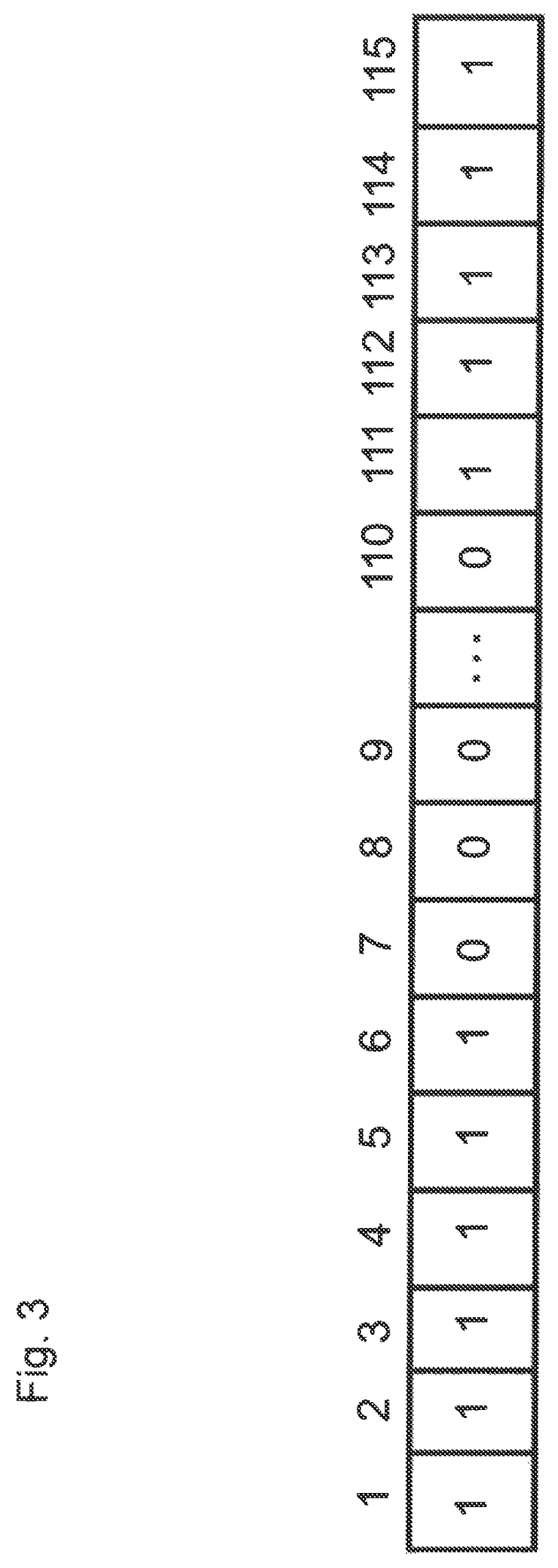

FIG. 3 is an explanatory view illustrating an example of the packet arrival presence/absence confirmation information. FIG. 3 illustrates, in a table form, that numbers 1 to 115 (also referred to as packet numbers) are respectively added to 115 packets which constitute a packet train. In addition, "1" is set for a packet which was successfully received, and "0" is set for a packet which failed to be received.

In the example illustrated in FIG. 3, the packet arrival presence/absence confirmation information indicates that the packets with packet numbers 1-6 and 111-115 were successfully received, and the packets with packet numbers 7-110 failed to be received.

The packet loss model application functional unit 122 calculates a coincidence degree between the packet arrival presence/absence confirmation information, which the packet presence/absence confirmation functional unit 121 generated, and a packet loss model. The packet loss model is a model which is used in order to determine whether a part of the packets constituting the packet train is concentratedly lost due to a processing performance of the communication device 100. In addition, the packet loss model is stored, for example, in the measurement data storage unit 160.

Figure 4:
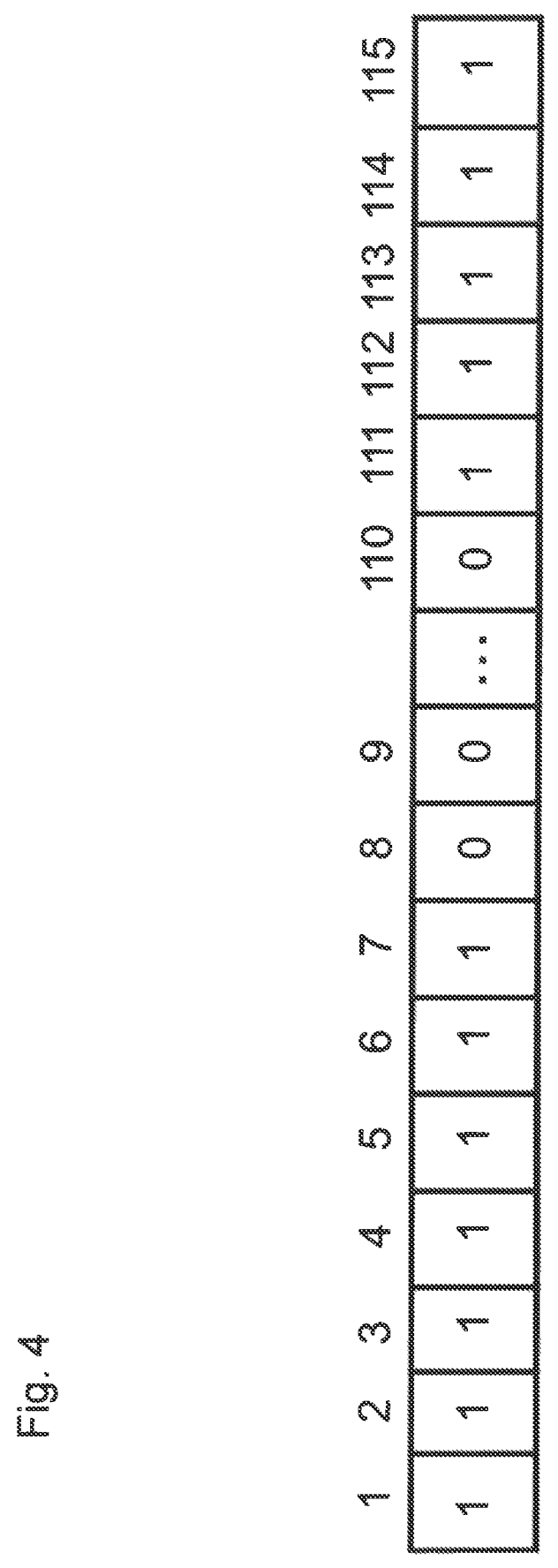

FIG. 4 is an explanatory view illustrating an example of the packet loss model. FIG. 4 illustrates, by way of example, a packet loss model in which, of 115 packets which constitute a packet train and to which packet numbers are added, the packets with packet numbers 1-7 and 111-115 were successfully received and "1" is set for these packets, and the packets with packet numbers 8 to 110 failed to be received and "0" is set for these packets.

Figure 5:
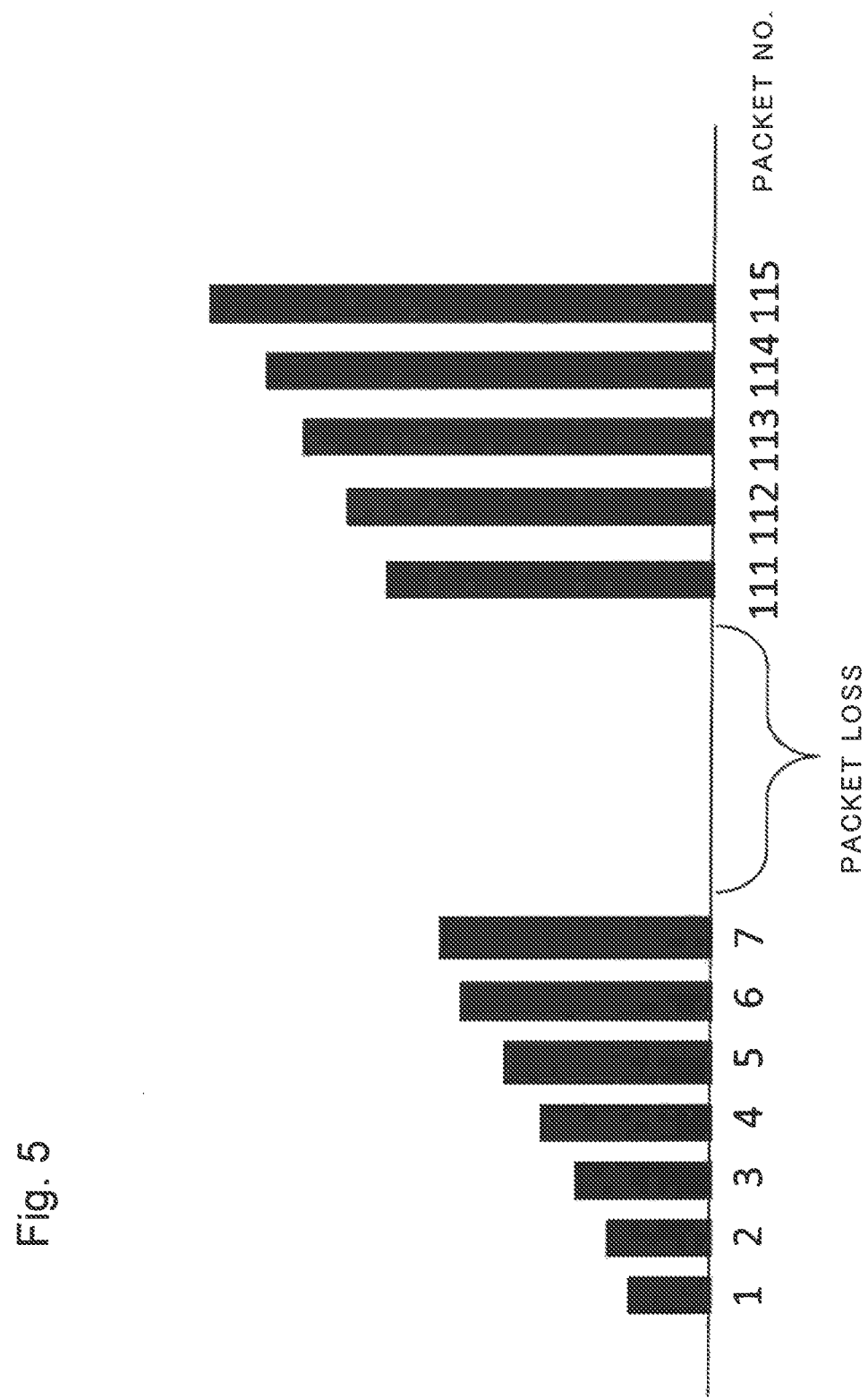
FIG. 5 is an explanatory view illustrating an example of each packet constituting a packet train corresponding to the packet loss model illustrated in FIG. 4.

FIG. 5 is an explanatory view illustrating an example of each packet constituting a packet train corresponding to the packet loss model illustrated in FIG. 4.

FIG. 5 illustrates that the packet train is composed such that packet sizes become larger at a predetermined ratio in ascending order of the packet numbers. Specifically, it is illustrated that the packet train is composed of packets which are generated so as to have greater sizes at a predetermined ratio in the order of transmission. In addition, the example illustrated in FIG. 5 indicates that the packets with packet numbers 8 to 110 are not received.

Accordingly, the packet loss model application functional unit 122 calculates a coincidence degree between the packet arrival presence/absence confirmation information and the packet loss model, based on the success/failure of reception of each packet, which is indicated by the packet arrival presence/absence confirmation information, and the success/failure of reception of each packet, which is indicated by the packet loss model.

The measuring means selection functional unit 123 determines whether the packets received by the communication unit 110 are to be input to the reception interval measuring unit 130 or to the reception data measuring unit 150, based on the coincidence degree which the packet loss model application functional unit 122 calculated.

Information indicative of the packet loss model is stored in the packet information storage unit 124.

Figure 6:
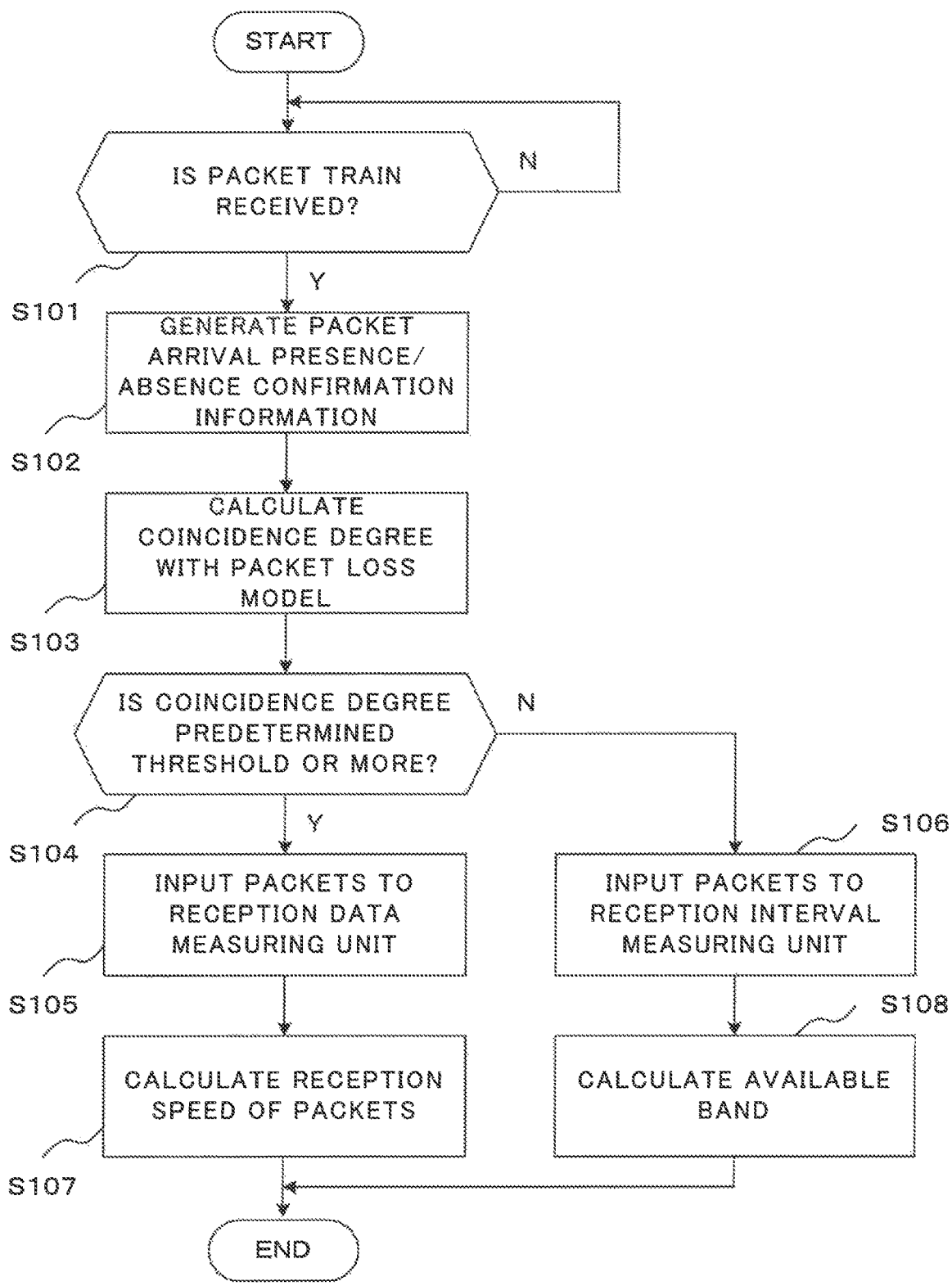
FIG. 6 is an explanatory view illustrating an operation of the communication device of the first example embodiment of the present invention.

Next, an operation of the communication device 100 of the first example embodiment of the present invention will be described. FIG. 6 is an explanatory view illustrating the operation of the communication device 100 of the first example embodiment of the present invention.

When the communication unit 110 received a packet train which the communication device 600 transmitted (step S101), the packet presence/absence confirmation functional unit 121 of the packet loss determination unit 120 generates packet arrival presence/absence confirmation information corresponding to the reception state of the packet train (step S102). The packet presence/absence confirmation functional unit 121 stores the packet arrival presence/absence confirmation information, which was generated in the process of step S102, in the packet information storage unit 124.

The packet loss model application functional unit 122 calculates a coincidence degree between the packet arrival presence/absence confirmation information, which the packet presence/absence confirmation functional unit 121 generated in the process of step S102, and the packet loss model stored in the packet information storage unit 124 (step S103).

Specifically, the packet loss model application functional unit 122 calculates, for example, a ratio of coincidence between a value, which is set for each packet in the packet arrival presence/absence confirmation information, and a value which is set for each packet in the packet loss model. In the present example, the values set for the packets with packet numbers 1-6 and 111-115 are "1" in both the packet arrival presence/absence confirmation information and the packet loss model, and the values coincide between both. In addition, in this example, the values set for the packets with packet numbers 8-110 are "0" in both the packet arrival presence/absence confirmation information and the packet loss model, and the values coincide between both. However, the value set for the packet with packet number 7 is "0" in the packet arrival presence/absence confirmation information, and is "1" in the packet loss model, and the value does not coincide between both.

In other words, the values set for the packets in the packet arrival presence/absence confirmation information and the values set for the packets in the packet loss model coincide with respect to 114 packets of the 115 packets. Accordingly, the ratio (percentage) of coincidence between the values set for the packets in the packet arrival presence/absence confirmation information and the values set for the packets in the packet loss model is 114/115=99.1% (the second decimal place is rounded).

Note that a plurality of mutually different kinds of packet loss models may be stored in the measurement data storage unit 160. In addition, the packet loss model application functional unit 122 may be configured to calculate each of coincidence degrees between the plural kinds of packet loss models and the packet arrival presence/absence confirmation information, and to adopt the coincidence degree of the greatest value. According to such a configuration, it is possible to adapt to various loss patterns.

The measuring means selection functional unit 123 determines whether the packets received by the communication unit 110 are to be input to the reception interval measuring unit 130 or to the reception data measuring unit 150, based on the coincidence degree which the packet loss model application functional unit 122 calculated (step S104).

Specifically, for example, when the value of the coincidence degree, which the packet loss model application functional unit 122 calculated in the process of step S103, is a predetermined threshold or more (Y in step S104), the measuring means selection functional unit 123 determines that the packets received by the communication unit 110 are to be input to the reception data measuring unit 150, and inputs the packets to the reception data measuring unit 150 (step S105). In addition, for example, when the value of the coincidence degree, which the packet loss model application functional unit 122 calculated in the process of step S103, is less than the predetermined threshold (N in step S104), the measuring means selection functional unit 123 determines that the packets received by the communication unit 110 are to be input to the reception interval measuring unit 130, and inputs the packets to the reception interval measuring unit 130 (step S106).

Note that the predetermined threshold is, for example, 80. Then, in this example, the value of the coincidence degree, which the packet loss model application functional unit 122 calculated in the process of step S103, is 99.1 and is a value which is 80, i.e. the predetermined threshold, or more. Accordingly, in this example, it is assumed that the measuring means selection functional unit 123 determined, in the process of step S104, that the packets received by the communication unit 110 were to be input to the reception data measuring unit 150, and input the packets to the reception data measuring unit 150 in the process of step S105.

The reception data measuring unit 150 calculates the reception speed of the packets, based on the input of the packets in the process of step S105 (step S107). The calculated reception speed is, in other words, the available band for the communication device 600.

Specifically, in the process of step S107, the reception data measuring unit 150 integrates the data amount of packets which were input in the process of step S105, and calculates the data amount received by the communication device 100. In addition, based on a reception time instant of the first input packet and a reception time instant of the last input packet in the process of step S105, the reception data measuring unit 150 calculates a reception time which is a time of a difference between these time instants. Then, by dividing the calculated data amount by the calculated reception time, the reception data measuring unit 150 calculates a reception data amount (reception speed) per unit time, which is the quotient. Accordingly, in the process of step S107, the reception speed, which is the available band, is calculated based on the size of a series of packets and the time required for the reception of the series of packets.

In addition, based on the input of the packets in the process of step S106, the reception interval measuring unit 130 measures the reception intervals of the packets. Then, the available band measuring unit 140 calculates an available band for the communication device 600, based on the packet reception intervals which the reception interval measuring unit 130 measured (step S108). Note that the available band measuring unit 140 calculates the available band by using publicly known technology in the process of step S108.

According to present example embodiment, when the communication device 100 receives a packet train transmitted by the communication device 600, the communication device 100 calculates an available band for the communication device 600 by a method corresponding to the reception states of the packets. Specifically, the communication device 100 determines whether a part of the packets constituting the packet train is concentratedly lost due to the processing performance of the communication device 100. Then, the communication device 100 determines the calculation method of the available band, in accordance with the result of the determination. Further, based on the received packets, the communication device 100 calculates the available band by the determined calculation method.

Therefore, the communication device 100 can properly calculate the available band, in accordance with the reception states of packets.

Example Embodiment 2

Figure 7:
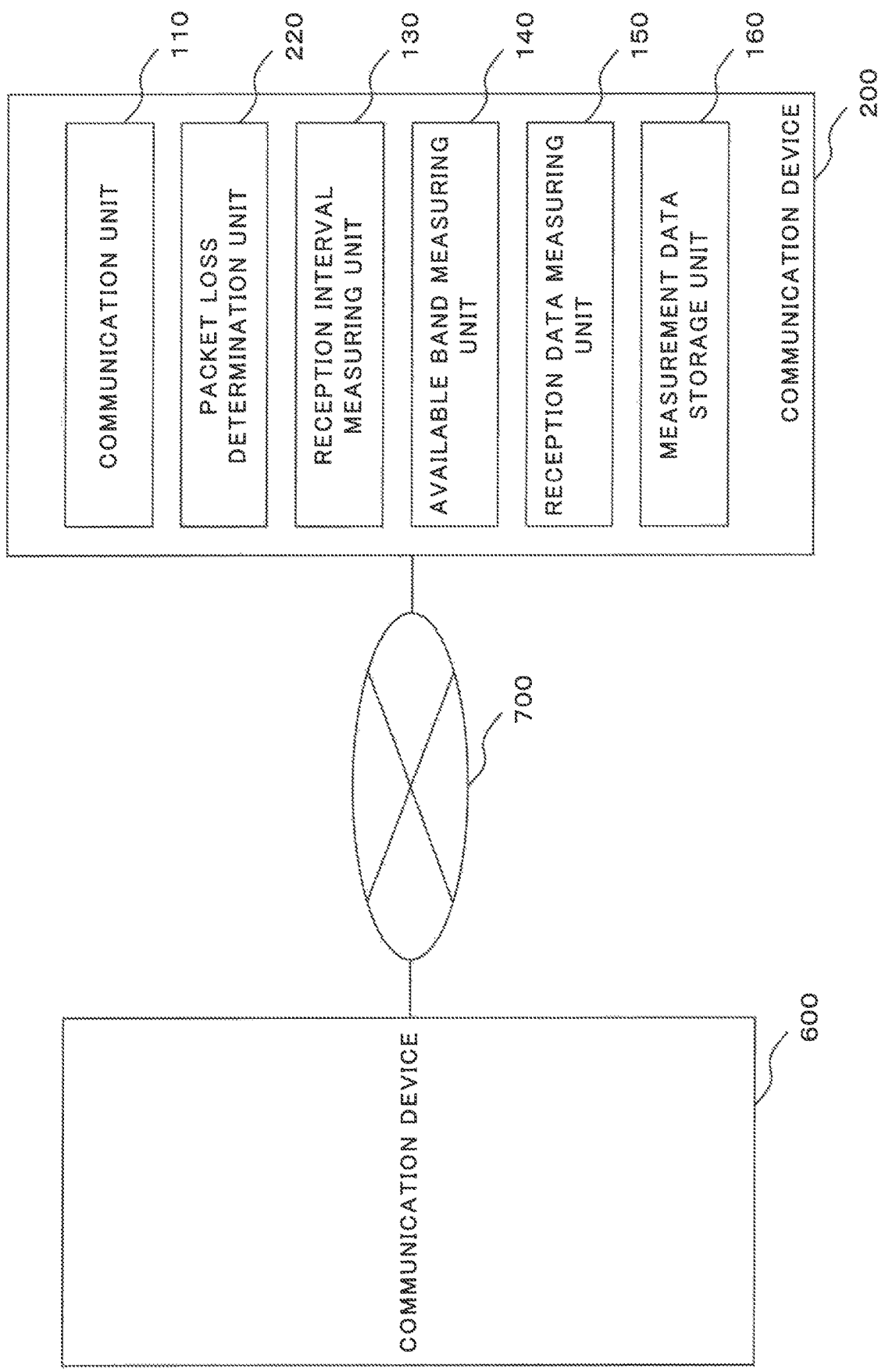
FIG. 7 is a block diagram illustrating a configuration example of a communication device of a second example embodiment of the present invention.

A communication device 200 of a second example embodiment of the present invention will be described with reference to the accompanying drawings. FIG. 7 is a block diagram illustrating a configuration example of the communication device 200 of the second example embodiment of the present invention. As illustrated in FIG. 7, the communication device 200 of the second example embodiment of the present invention is different from the communication device 100 of the first example embodiment of the present invention, which is illustrated in FIG. 1, in that the communication device 200 includes a packet loss determination unit 220. Since the other structural elements are similar to those of the communication device 100 of the first example embodiment of the present invention, which is illustrated in FIG. 1, the corresponding structural elements are denoted by the same reference signs as in FIG. 1, and a description thereof is omitted.

Figure 8:
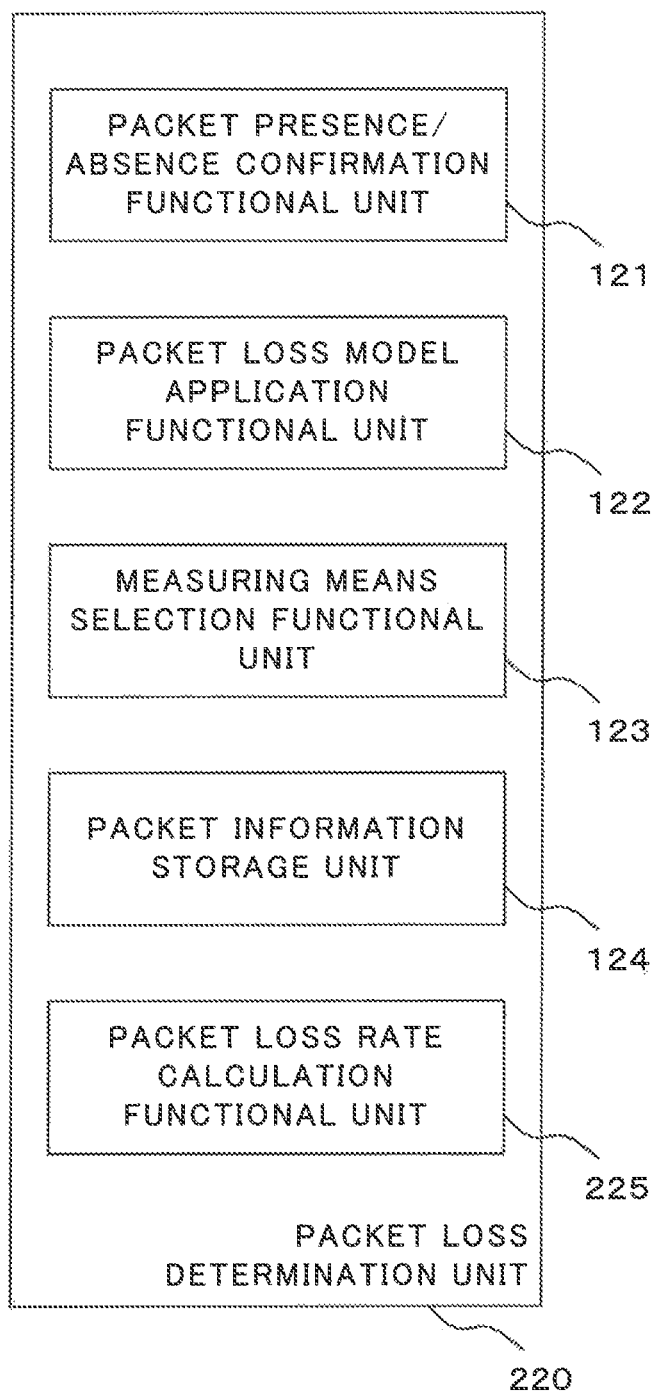
FIG. 8 is a block diagram illustrating a configuration example of a packet loss determination unit in the communication device of the second example embodiment of the present invention.

FIG. 8 is a block diagram illustrating a configuration example of the packet loss determination unit 220 in the communication device 200 of the second example embodiment of the present invention. As illustrated in FIG. 8, the packet loss determination unit 220 in the communication device 200 of the second example embodiment of the present invention is different from the packet loss determination unit 120 in the communication device 100 of the first example embodiment of the present invention, which is illustrated in FIG. 2, in that the packet loss determination unit 220 includes a packet loss rate calculation functional unit 225. Since the other structural elements are similar to those of the packet loss determination unit 120 in the communication device 100 of the first example embodiment of the present invention, which is illustrated in FIG. 2, the corresponding structural elements are denoted by the same reference signs as in FIG. 2, and a description thereof is omitted.

The packet loss rate calculation functional unit 225 calculates a packet loss rate which is a loss rate of packets included in the packet train that is received from the communication device 600. In addition, the packet loss rate calculation functional unit 225 inputs the received packet train to the reception interval measuring unit 130, when the calculated packet loss rate is less than a predetermined threshold.

Figure 9:
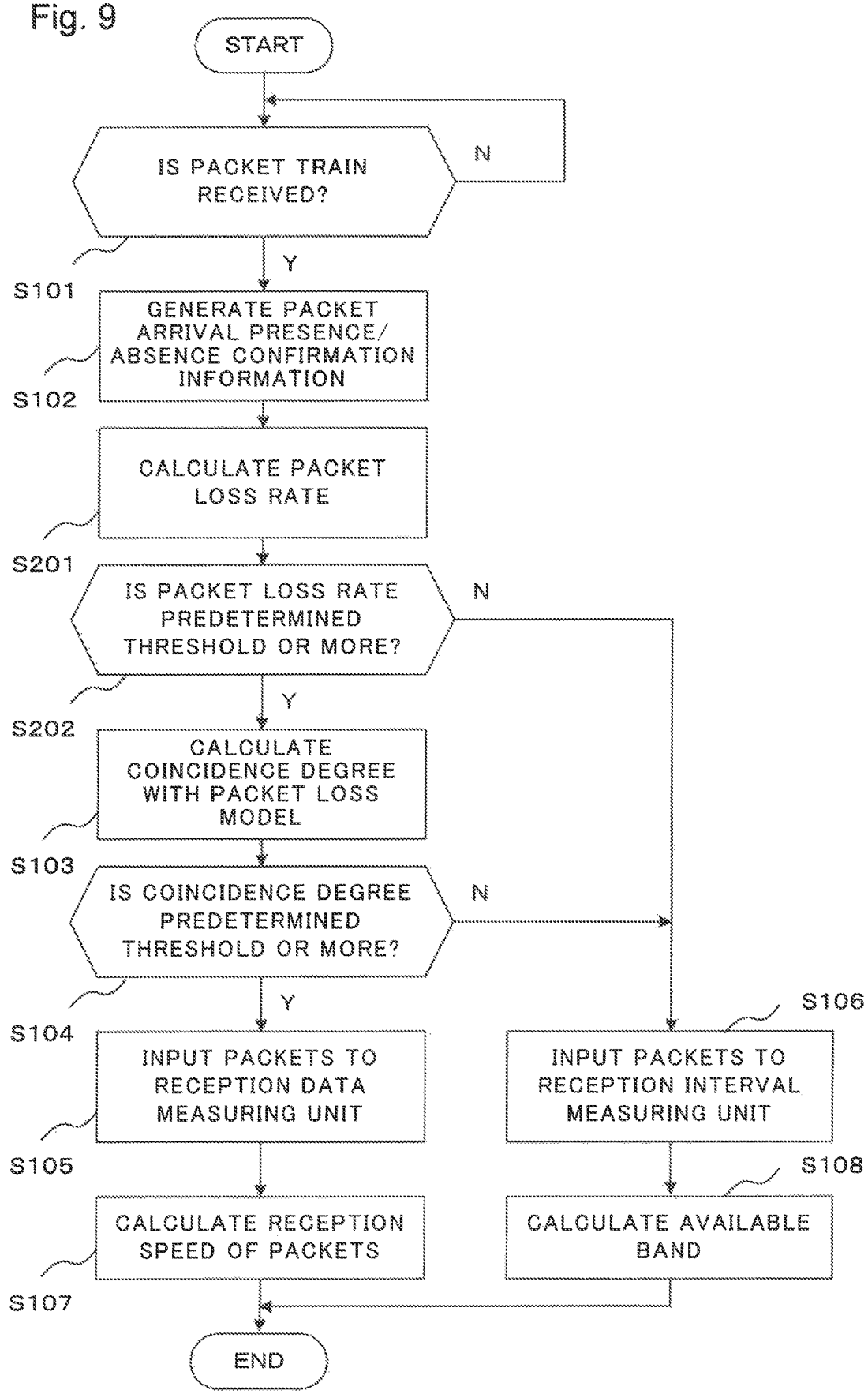
FIG. 9 is a flowchart illustrating an operation of the communication device of the second example embodiment of the present invention.

Next, an operation of the communication device 200 of the second example embodiment of the present invention will be described. FIG. 9 is a flowchart illustrating the operation of the communication device 200 of the second example embodiment of the present invention. As illustrated in FIG. 9, in the operation of the communication device 200 of the second example embodiment of the present invention, processes of steps S201 and S202 are added to the operation of the communication device 100 of the first example embodiment of the present invention, which is illustrated in FIG. 6.

Specifically, when the packet presence/absence confirmation functional unit 121 in the communication device 200 generates packet arrival presence/absence confirmation information in the process of step S102, the packet loss rate calculation functional unit 225 calculates a packet loss rate, based on the packet arrival presence/absence confirmation information (step S201).

The method of calculating the packet loss rate will now be described. The packet loss rate calculation functional unit 225 calculates the packet loss rate by calculating the ratio of packets with the set value "0" in the packet arrival presence/absence confirmation information. To be more specific, in the example of FIG. 3, "0" is set for the packets with packet numbers 7 to 110 among the 115 packets. In other words, the number of packets for which "0" is set is 104. Then, the packet loss rate calculation functional unit 225 executes a calculation of 104/115=0.90 (the third decimal place is rounded). In addition, based on the result of this calculation, the packet loss rate calculation functional unit 225 calculates that the packet loss rate is 90%.

The packet loss rate calculation functional unit 225 compares the value of the packet loss rate calculated in the process of step S201, with a predetermined threshold (e.g. 10) (step S202).

Note that the predetermined threshold is set according to whether the available band can properly be calculated or not, by using publicly known technology in the process of step S108. Specifically, the threshold is preset such that the available band measuring unit 140 can properly calculate the available band by using publicly known technology in the process of step S108, when the value of the packet loss rate is the threshold or more.

Then, when the value of the packet loss rate, which was calculated in the process of step S201, is the predetermined threshold or more (Y in step S202), the packet loss rate calculation functional unit 225 transitions to the process of step S103. Otherwise (N in step S202), the packet loss rate calculation functional unit 225 transitions to the process of step S106.

In the present example, the value of the packet loss rate is 90 and is a value which is the predetermined threshold, i.e. 10, or more. Accordingly, the packet loss rate calculation functional unit 225 transitions to the process of step S103.

According to the present example embodiment, when the value of the packet loss rate, which the packet loss rate calculation functional unit 225 calculated, is less than the predetermined threshold, the packets are input to the reception interval measuring unit 130, without the execution of the process of comparing the packet arrival presence/absence confirmation information and the packet loss model. Then, the reception data measuring unit 150 measures the reception intervals of the packets, and the available band measuring unit 140 calculates the available band, based on the result of measurement.

Here, in general, the processing load of the process in which the packet loss rate calculation functional unit 225 calculates the packet loss rate is lighter than the processing load of the process of comparing the packet arrival presence/absence confirmation information and the packet loss model.

Therefore, in addition to the advantageous effects in the first example embodiment, the available band can be calculated with a lighter processing load.

Example Embodiment 3

Figure 10:
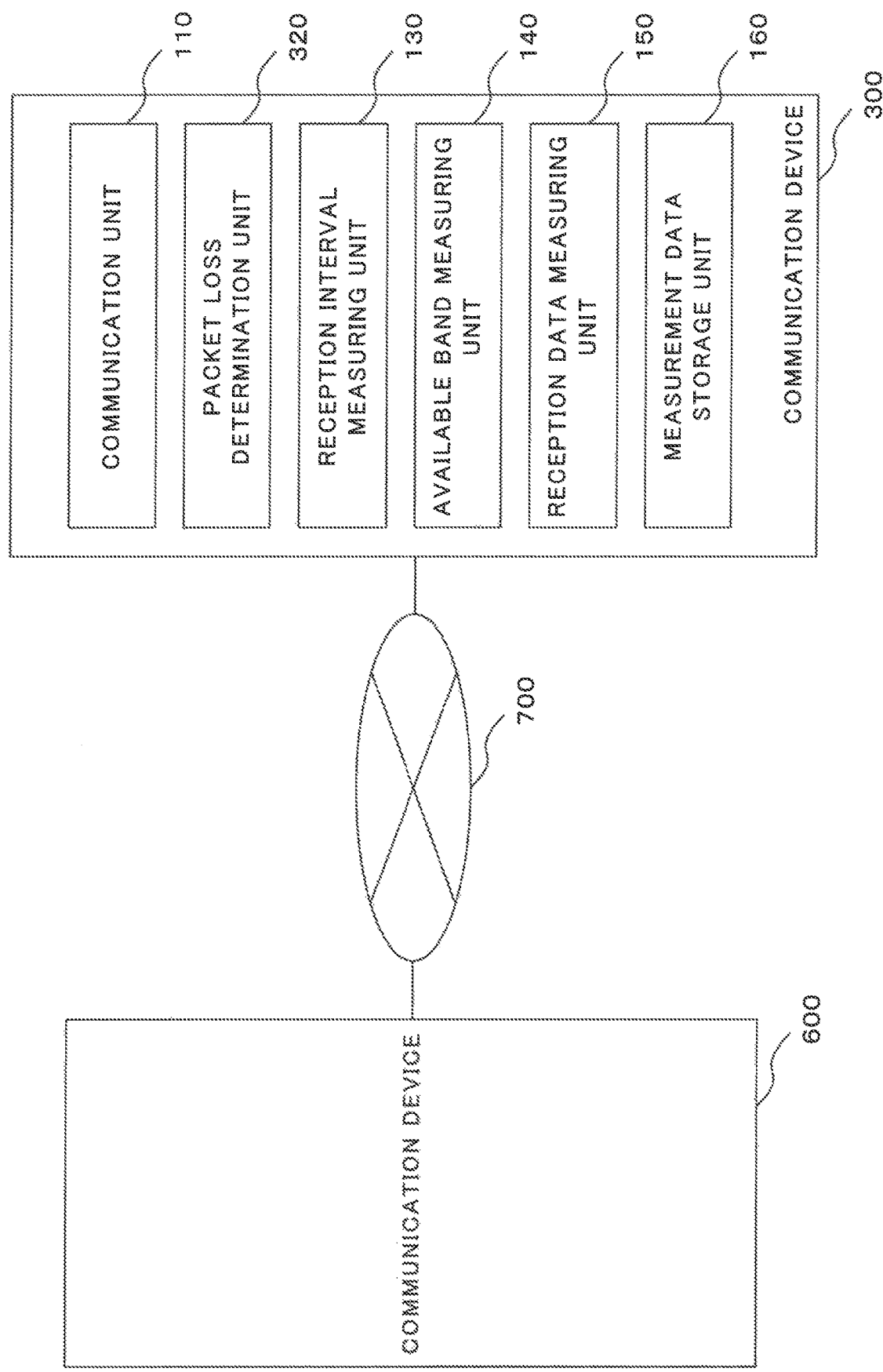
FIG. 10 is a block diagram illustrating a configuration example of a communication device of a third example embodiment of the present invention.

Next, a communication device 300 of a third example embodiment of the present invention will be described with reference to the accompanying drawings. FIG. 10 is a block diagram illustrating a configuration example of the communication device 300 of the third example embodiment of the present invention. As illustrated in FIG. 10, the communication device 300 of the third example embodiment of the present invention is different from the communication device 100 of the first example embodiment of the present invention, which is illustrated in FIG. 1, in that the communication device 300 includes a packet loss determination unit 320. Since the other structural elements are similar to those of the communication device 100 of the first example embodiment of the present invention, which is illustrated in FIG. 1, the corresponding structural elements are denoted by the same reference signs as in FIG. 1, and a description thereof is omitted.

Figure 11:
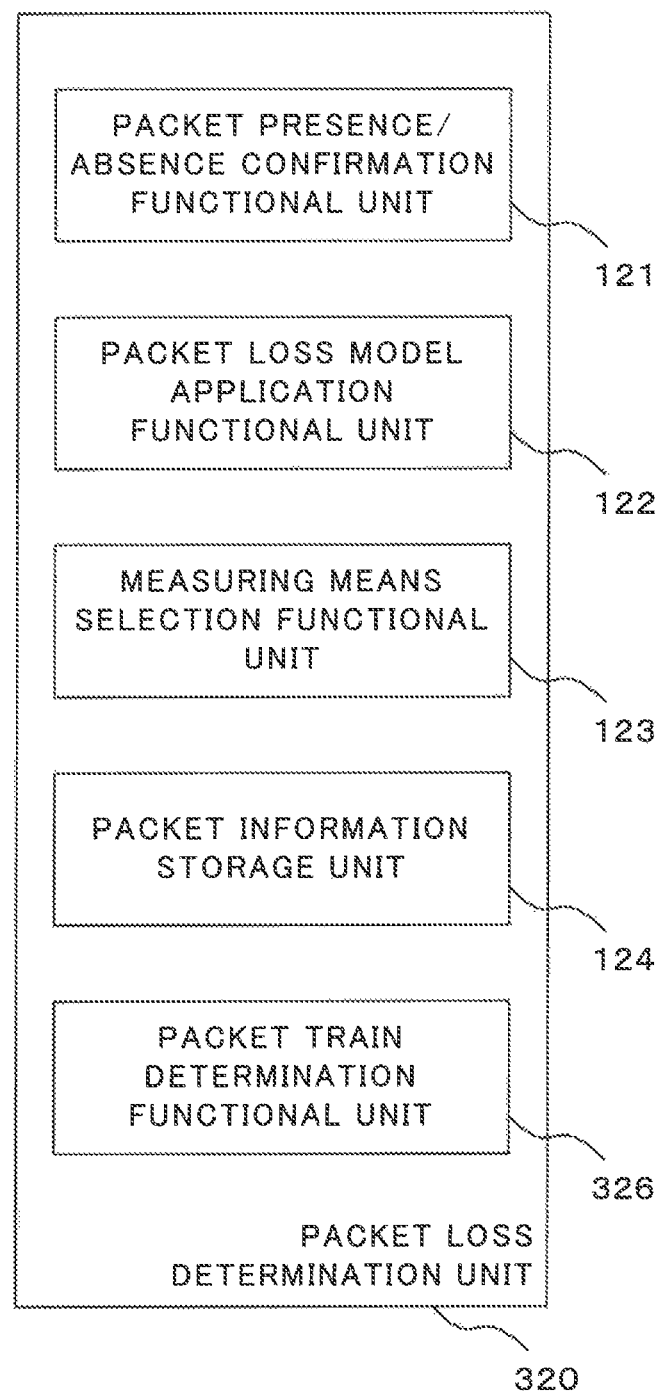
FIG. 11 is a block diagram illustrating a configuration example of a packet loss determination unit in the communication device of the third example embodiment of the present invention.

FIG. 11 is a block diagram illustrating a configuration example of the packet loss determination unit 320 in the communication device 300 of the third example embodiment of the present invention. As illustrated in FIG. 11, the packet loss determination unit 320 in the communication device 300 of the third example embodiment of the present invention is different from the packet loss determination unit 120 in the communication device 100 of the first example embodiment of the present invention, which is illustrated in FIG. 2, in that the packet loss determination unit 320 includes a packet train determination functional unit 326. Since the other structural elements are similar to those of the packet loss determination unit 120 in the communication device 100 of the first example embodiment of the present invention, which is illustrated in FIG. 2, the corresponding structural elements are denoted by the same reference signs as in FIG. 2, and a description thereof is omitted.

The packet train determination functional unit 326 determines whether the reception interval measuring unit 130 can calculate the available band or not, based on the reception states of packets after the occurrence of concentrated packet loss. Then, in accordance with the determination result, the packet train determination functional unit 326 inputs the received packets to the reception interval measuring unit 130 or reception data measuring unit 150.

Figure 12:
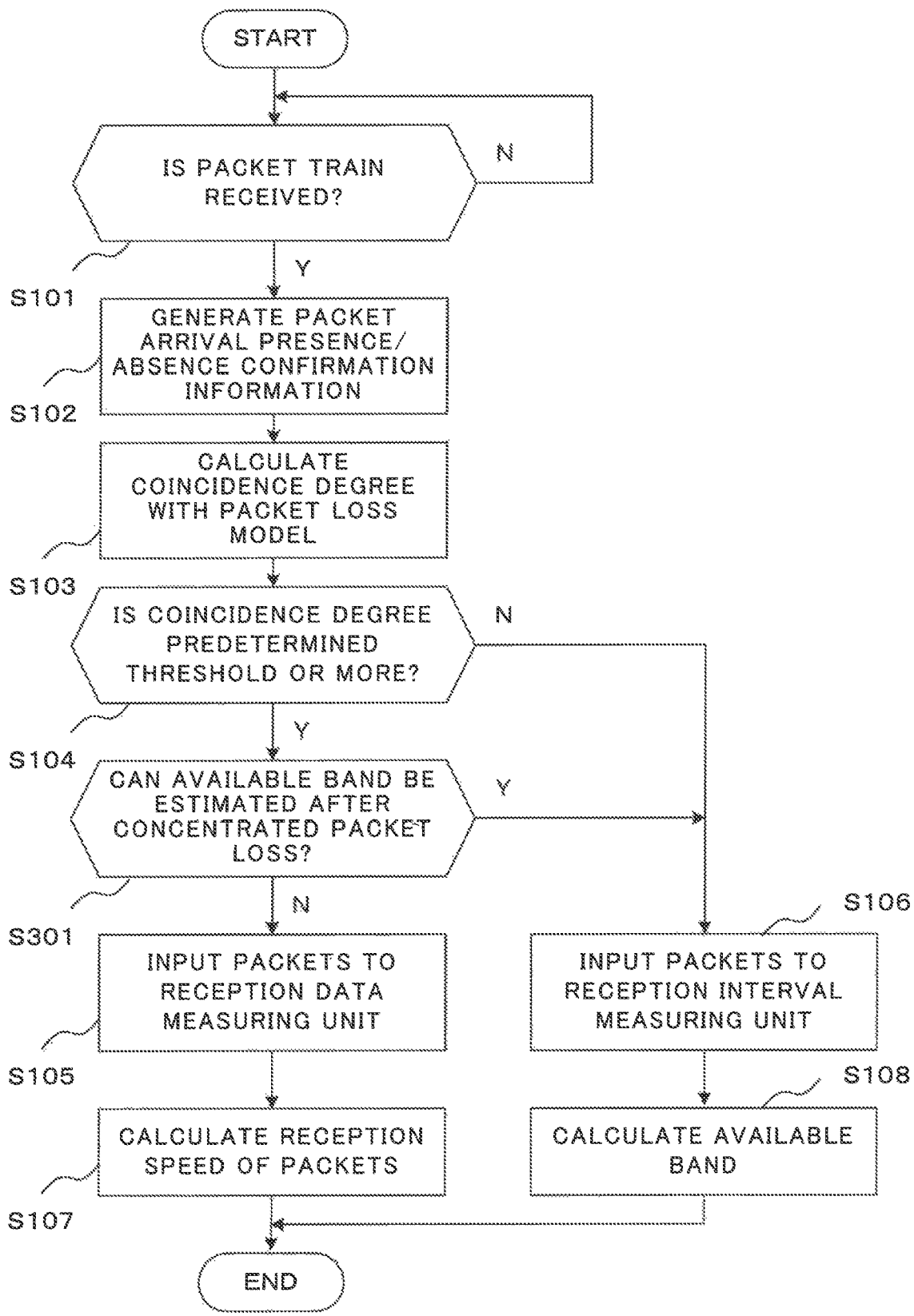
FIG. 12 is a flowchart illustrating an operation of the communication device of the third example embodiment of the present invention.

Next, an operation of the communication device 300 of the third example embodiment of the present invention will be described. FIG. 12 is a flowchart illustrating the operation of the communication device 300 of the third example embodiment of the present invention. As illustrated in FIG. 12, in the operation of the communication device 300 of the third example embodiment of the present invention, a process of step S301 is added to the operation of the communication device 100 of the first example embodiment of the present invention, which is illustrated in FIG. 6.

Specifically, when the value of the coincidence degree calculated in the process of step S103 by the packet loss model application functional unit 122 in the communication device 300 is the predetermined threshold or more (Y in step S104), the packet train determination functional unit 326 determines whether the available band can be estimated or not, based on the packets after the occurrence of concentrated packet loss (step S301).

Figure 13:
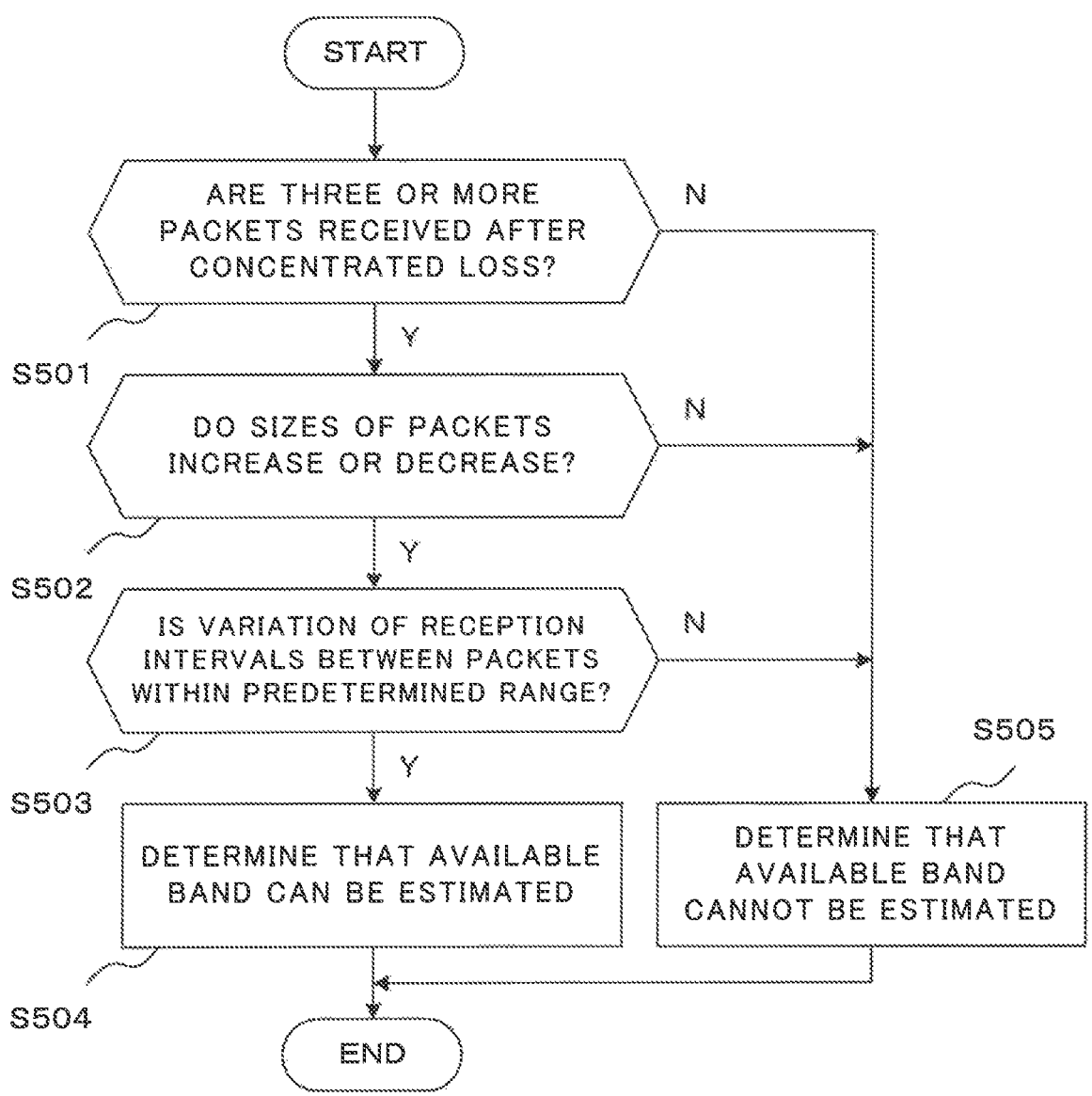
FIG. 13 is a flowchart illustrating a process of step S301.

FIG. 13 is a flowchart illustrating the process of step S301. As illustrated in FIG. 13, the packet train determination functional unit 326 first determines whether three or more packets are received after the occurrence of concentrated packet loss (step S501).

Specifically, the packet train determination functional unit 326 determines whether three or more packets are received after the occurrence of concentrated packet loss, for example, based on whether "1" is set for each of the last three packets of the packet train by the packet arrival presence/absence confirmation information generated by the packet presence/absence confirmation functional unit 121. In the example of the packet arrival presence/absence confirmation information illustrated in FIG. 3, when "1" is set for each of the packets with packet numbers 113 to 115, the packet train determination functional unit 326 determines that three or more packets are received after the occurrence of concentrated packet loss, and transitions to the process of step S502 (Y in step S501). Otherwise (N in step S501), the packet train determination functional unit 326 transitions to the process of step S505. Accordingly, when the communication unit 110 did not receive any one of a predetermined number (three in this example; the predetermined number may be two, or four or more) of packets from the last one in the transmitted packet train (N in step S501), the packet train determination functional unit 326 transitions to the process of step S505.

Next, the packet train determination functional unit 326 determines whether the sizes of the last three or more packets, which are received after the occurrence of concentrated packet loss, increase or decrease at a predetermined ratio in the order of transmission (step S502).

In the example illustrated in FIG. 5, the sizes of the packets with packet numbers 111 to 115, which are received after the occurrence of concentrated packet loss, increase at the predetermined ratio. Thus, in this example, the packet train determination functional unit 326 determines that the sizes of the packets, which are received after the occurrence of concentrated packet loss, increase at the predetermined ratio in the order of transmission (Y in step S502), and transitions to the process of step S503.

Besides, when the sizes of a predetermined number (three in this example; the predetermined number may be two, or four or more) of packets from the last one in the transmitted packet train neither increase nor decrease at the predetermined ratio in the order of transmission (N in step S502), the packet train determination functional unit 326 transitions to the process of step S505. Note that, in the process of step S502, the packet train determination functional unit 326 may be configured to determine whether the sizes of the last three packets of the packet train (in the example illustrated in FIG. 5, the packets with packet numbers 113 to 115) increase or decrease at a predetermined ratio in the order of transmission.

Further, the packet train determination functional unit 326 determines whether a variation of intervals of reception of the last three packets of the packet train is within a predetermined range or not (step S503).

Specifically, in the present example, the packet train determination functional unit 326 calculates a difference between an interval, which is between a timing of reception of the packet with packet number 113 and a timing of reception of the packet with packet number 114, and an interval, which is between the timing of reception of the packet with packet number 114 and a timing of reception of the packet with packet number 115. Then, when the value of the difference of the calculation result is within a predetermined range, the packet train determination functional unit 326 determines that the variation of the intervals of reception of the packets after the occurrence of concentrated packet loss is within the predetermined range. The reason why the determination in the process of step S503 is executed is described. In the process of step S503, when the variation of intervals of reception of the last three packets of the packet train is outside the predetermined range, it is considered that the reception intervals of the packets after the occurrence of concentrated packet loss also vary outside the predetermined range and it is difficult to estimate the available band with high precision.

In addition, when each value of the difference in interval of timings of each reception of a predetermined number (three in this example; the predetermined number may be two, or four or more) of packets from the last one in the transmitted packet train is not within the predetermined range (N in step S503), the packet train determination functional unit 326 transitions to the process of step S505.

When the packet train determination functional unit 326 determines "Y" in each of the processes of steps S501 to S503, the packet train determination functional unit 326 determines that the available band can be estimated, based on the packets after the occurrence of concentrated packet loss (step S504, Y in S301), and transitions to the process of step S106. Then, in the process of step S106, the measuring means selection functional unit 123 inputs the packets, which the communication unit 110 received after the occurrence of concentrated packet loss, to the reception interval measuring unit 130 (step S106).

Besides, when the packet train determination functional unit 326 determines "N" in any one of the processes of steps S501 to S503, the packet train determination functional unit 326 determines that the available band cannot be estimated, based on the packets after the occurrence of concentrated packet loss (step S505, N in S301), and transitions to the process of step S105. Then, in the process of step S105, the measuring means selection functional unit 123 inputs the packets, which the communication unit 110 received before and after the occurrence of concentrated packet loss, to the reception data measuring unit 150 (step S105).

According to the present example embodiment, the communication device 300 determines the calculation method of the available band in accordance with the reception states of the packets after the occurrence of concentrated packet loss. Then, depending on the reception states, the communication device 300 calculates the available band for the communication device 600, based on the reception states of the packets after the occurrence of concentrated packet loss. In other words, based on the reception states of a less number of packets, the available band for the communication device 600 is calculated.

Therefore, in addition to the advantageous effects in the first example embodiment, the available band can be calculated with a less calculation amount.

Note that the above-described example embodiments may be combined. Concretely, for example, such a configuration may be adopted that the processes of steps S201 and S202 in the second example embodiment illustrated in FIG. 9 are executed before the process of step S103 in the third example embodiment illustrated in FIG. 12.

According to such a configuration, both the advantageous effects of the second example embodiment and the advantageous effects of the third example embodiment can be obtained.

Example Embodiment 4

Figure 14:
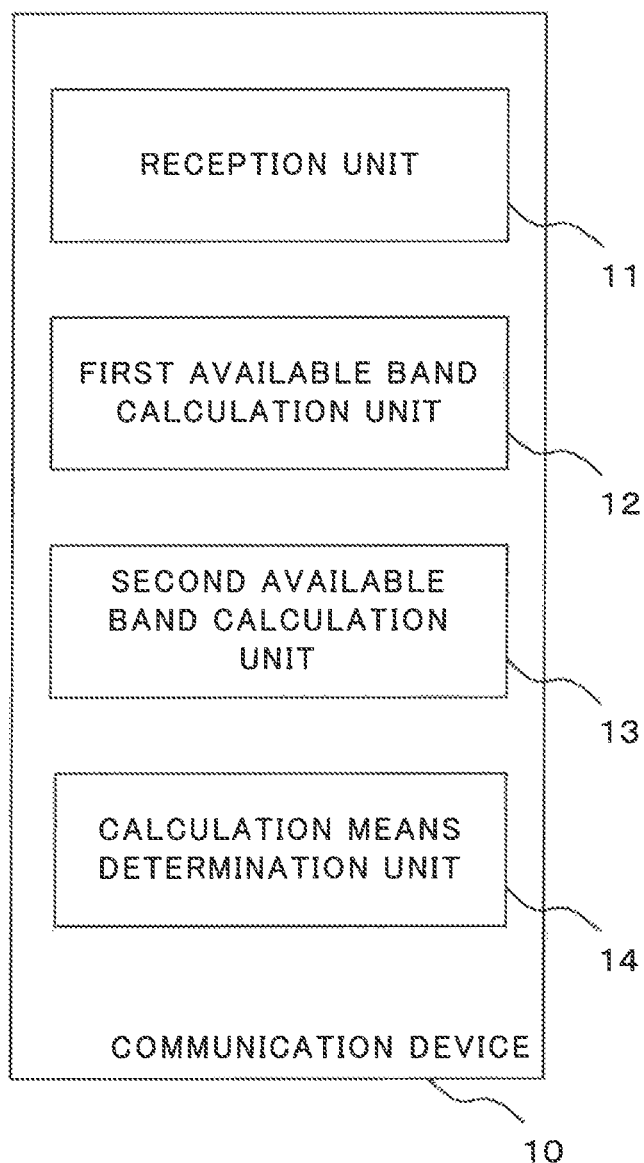
FIG. 14 is a block diagram illustrating a configuration example of a communication device of a fourth example embodiment of the present invention.

Next, a communication device 10 of a fourth example embodiment of the present invention will be described with reference to the accompanying drawings. FIG. 14 is a block diagram illustrating a configuration example of the communication device 10 of the fourth example embodiment of the present invention. As illustrated in FIG. 14, the communication device 10 of the fourth example embodiment of the present invention includes a reception unit 11, a first available band calculation unit 12, a second available band calculation unit 13, and a calculation means determination unit 14.

The reception unit 11 corresponds to, for example, the communication unit 110 illustrated in FIG. 1, etc. The first available band calculation unit 12 corresponds to, for example, the reception interval measuring unit 130 and available band measuring unit 140 illustrated in FIG. 1, etc. The second available band calculation unit 13 corresponds to, for example, the reception data measuring unit 150 illustrated in FIG. 1, etc. The calculation means determination unit 14 corresponds to, for example, the packet loss determination unit 120 or the like illustrated in FIG. 1, etc.

The reception unit 11 receives transmitted packets.

The first available band calculation unit 12 and second available band calculation unit 13 calculate an available band for a transmission source of the packets.

The calculation means determination unit 14 determines, based on the reception states of the packets transmitted at predetermined time intervals in the reception unit 11, whether the first available band calculation unit 12 calculates the available band, or the second available band calculation unit 13 calculates the available band.

In addition, the first available band calculation unit 12 calculates the available band, based on reception intervals between the packets.

Besides, the second available band calculation unit 13 calculates the available band, based on a time required for the reception of a series of the transmitted packets and the sizes of the series of the packets.

According to the present example embodiment, the calculation means determination unit 14 determines, based on the reception states of the packets transmitted at predetermined time intervals in the reception unit 11, whether the first available band calculation unit 12 calculates the available band, or the second available band calculation unit 13 calculates the available band. In addition, in accordance with the determination result, the first available band calculation unit 12 or second available band calculation unit 13 calculates the available band for the transmission source of the packets.

Therefore, the available band can be properly calculated based on the reception states of the packets transmitted at predetermined time intervals.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-097597, filed on May 16, 2016, the disclosure of which is incorporated herein in its entirety by reference.

REFERENCE SIGNS LIST 10, 100, 200, 300, 600 Communication device
11 Reception unit
12 First available band calculation unit
13 Second available band calculation unit
14 Calculation means determination unit
110 Communication unit
120, 220, 320 Packet loss determination unit
121 Packet presence/absence confirmation functional unit
122 Packet loss model application functional unit
123 Measuring means selection functional unit
124 Packet information storage unit
130 Reception interval measuring unit
140 Available band measuring unit
150 Reception data measuring unit
160 Measurement data storage unit
225 Packet loss rate calculation functional unit
326 Packet train determination functional unit
700 Communication network

What is claimed is:

1. A communication device comprising:
a memory storing one or more instructions; and
a processor configured to execute the one or more instructions to implement:
   a reception unit configured to receive transmitted packets;
   a first available band calculation unit configured to calculate an available band for a transmission source of the packets;
   a second available band calculation unit configured to calculate the available band for the transmission source; and
   a calculation unit determination unit configured to determine, based on reception states of the packets transmitted at predetermined time intervals in the reception unit, whether the first available band calculation unit calculates the available band, or the second available band calculation unit calculates the available band,
   wherein the first available band calculation unit calculates the available band based on reception intervals between the packets,
   the second available band calculation unit calculates the available band based on a time required for the reception of a series of the transmitted packets and sizes of the series of the packets, and
   a storage unit configured to prestore model information indicative of a model corresponding to the series of the packets transmitted at the predetermined time intervals,
   wherein the calculation unit determination unit determines, based on the model information stored in the storage unit and the reception states of the packets by the reception unit, whether the first available band calculation unit calculates the available band, or the second available band calculation unit calculates the available band, and
   wherein when the calculation unit determination unit determines, based on the model information, that the reception unit does not receive any one of a predetermined number of packets from a last one in the transmitted series of packets, the calculation unit determination unit determines that the second available band calculation unit calculates the available band.

2. The communication device according to claim 1, wherein the calculation unit determination unit is configured:
to calculate a loss rate of the packets based on the reception states of the packets by the reception unit; and
to determine that the first available band calculation unit calculates the available band, when a value of a result of the calculation is less than a predetermined threshold.

3. A communication device comprising:
a memory storing one or more instructions; and
a processor configured to execute the one or more instructions to implement:
   a reception unit configured to receive transmitted packets;
   a first available band calculation unit configured to calculate an available band for a transmission source of the packets;
   a second available band calculation unit configured to calculate the available band for the transmission source; and
   a calculation unit determination unit configured to determine, based on reception states of the packets transmitted at predetermined time intervals in the reception unit, whether the first available band calculation unit calculates the available band, or the second available band calculation unit calculates the available band,
   wherein the first available band calculation unit calculates the available band based on reception intervals between the packets,
   the second available band calculation unit calculates the available band based on a time required for the reception of a series of the transmitted packets and sizes of the series of the packets, and
   a storage unit configured to prestore model information indicative of a model corresponding to the series of the packets transmitted at the predetermined time intervals,
   wherein the calculation unit determination unit determines, based on the model information stored in the storage unit and the reception states of the packets by the reception unit, whether the first available band calculation unit calculates the available band, or the second available band calculation unit calculates the available band, and
   wherein when sizes of a predetermined number of packets from a last one in the series of the packets received by the reception unit neither increase nor decrease at a predetermined ratio in an order of transmission, the calculation unit determination unit determines that the second available band calculation unit calculates the available band.

4. The communication device according to claim 3,
wherein the calculation unit determination unit is configured:
to calculate a loss rate of the packets based on the reception states of the packets by the reception unit; and
to determine that the first available band calculation unit calculates the available band, when a value of a result of the calculation is less than a predetermined threshold.

5. A communication device comprising:
a memory storing one or more instructions; and
a processor configured to execute the one or more instructions to implement:
   a reception unit configured to receive transmitted packets;
   a first available band calculation unit configured to calculate an available band for a transmission source of the packets;
   a second available band calculation unit configured to calculate the available band for the transmission source; and
   a calculation unit determination unit configured to determine, based on reception states of the packets transmitted at predetermined time intervals in the reception unit, whether the first available band calculation unit calculates the available band, or the second available band calculation unit calculates the available band,
wherein the first available band calculation unit calculates the available band based on reception intervals between the packets,
the second available band calculation unit calculates the available band based on a time required for the reception of a series of the transmitted packets and sizes of the series of the packets, and
a storage unit configured to prestore model information indicative of a model corresponding to the series of the packets transmitted at the predetermined time intervals,
wherein the calculation unit determination unit determines, based on the model information stored in the storage unit and the reception states of the packets by the reception unit, whether the first available band calculation unit calculates the available band, or the second available band calculation unit calculates the available band, and
wherein when a value of a difference in interval of timings, at which the reception unit receives each of a predetermined number of packets from a last one in the series of the packets, is not within a predetermined range, the calculation unit determination unit determines that the second available band calculation unit calculates the available band.

6. The communication device according to claim 5,
wherein the calculation unit determination unit is configured:
to calculate a loss rate of the packets based on the reception states of the packets by the reception unit; and
to determine that the first available band calculation unit calculates the available band, when a value of a result of the calculation is less than a predetermined threshold.

* * * * *